Jan. 5, 1932.  J. M. DAILY  1,839,952
DEVICE FOR MIXING GASES AND LIQUIDS
Filed Jan. 7, 1928
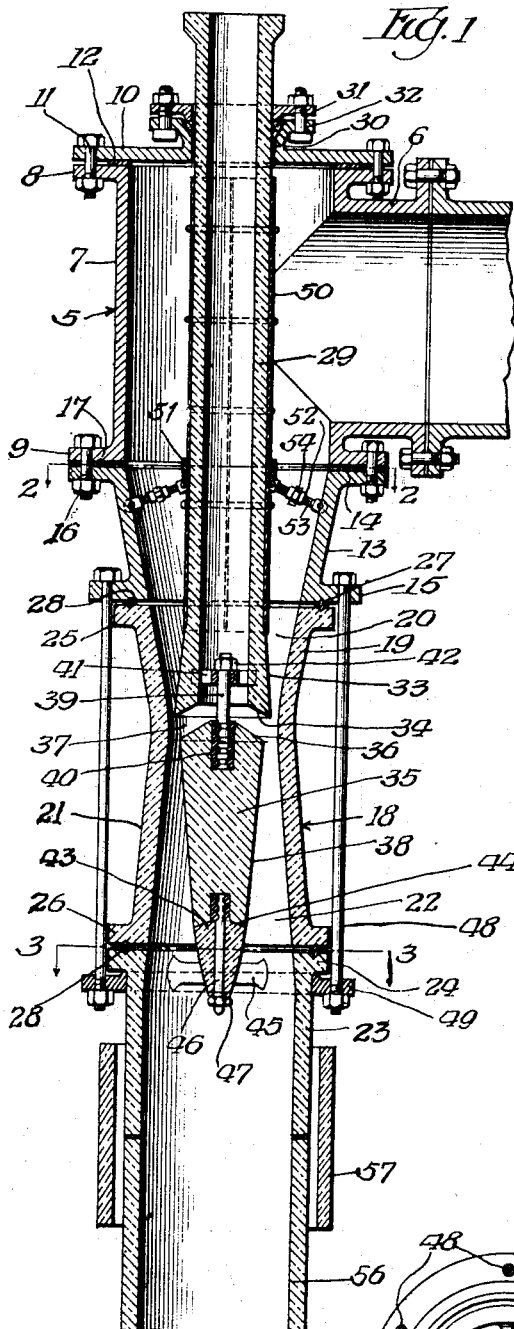
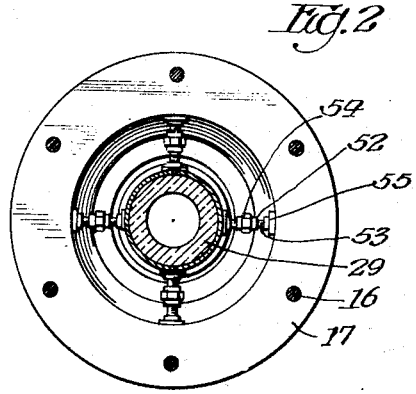
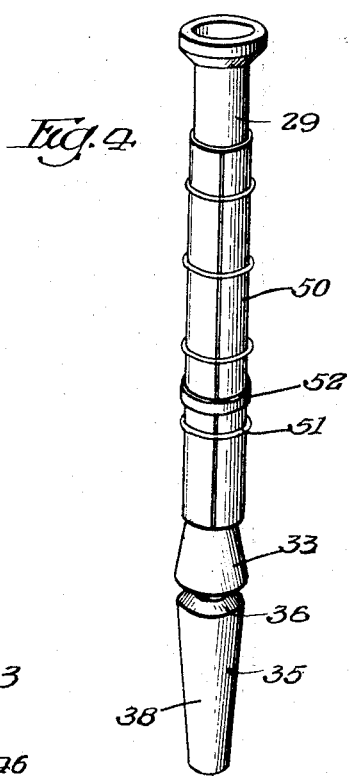
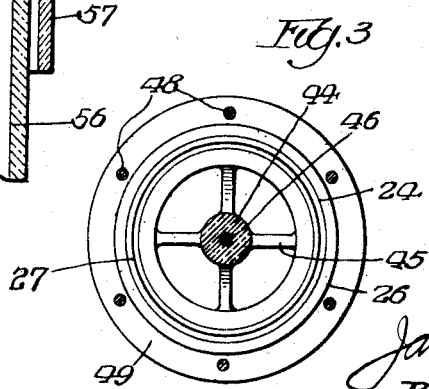
Inventor
James Marlowe Daily
By Fred Herlain
Atty.

Patented Jan. 5, 1932

1,839,952

UNITED STATES PATENT OFFICE

JAMES MARLOWE DAILY, OF CHICAGO, ILLINOIS, ASSIGNOR, BY DIRECT AND MESNE ASSIGNMENTS, TO AMERICAN OZONE COMPANY, OF CHICAGO, ILLINOIS, A CORPORATION OF ILLINOIS

DEVICE FOR MIXING GASES AND LIQUIDS

Application filed January 7, 1928. Serial No. 245,089.

The invention relates to devices for mixing gases and liquids and more particularly to those devices which are adapted for use in mixing ozone or ozonous air and water and in which the water is delivered under pressure and draws the ozone into contact or affiliation therewith by aspiration.

The primary object of the present invention is to provide a mixing device of this type which is more efficient in operation than devices which have heretofore been used and in which the ozone is thoroughly and uniformly commingled with the water. In general, this device comprises an open-ended pipe for the ozone or ozonous air, a casing or tubular member which extends around and tapers toward the open end of the pipe and forms with said pipe a comparatively wide and relatively thin tubular duct or conduit for the water, and a spreader which is arranged adjacent the open end of the pipe and operates to form an unobstructed substantially circular passage through which the ozone is drawn outwardly into contact or affiliation with the tubular stream of water. By forming the water conduit in the manner set forth, the water is spread out to form adjacent the circular passage a relatively large ozone contacting area. This results in efficient aspiration and a thorough and uniform commingling of the water and ozone.

Another object of the invention is to provide a mixing device of the aforementioned character in which provision is made for centering the ozone pipe and the spreader with respect to the tubular member or casing.

A further object of the invention is to provide an ozone and water mixer of the aspirator type, in which the parts which contact with the ozone and ozonated water are formed of non-oxidizing material, such, for example, as glass or tera cotta and are reinforced and constructed to prevent breakage by the impact and the pressure of the water.

A still further object of the invention is to provide a device for mixing a gas and liquid which is of new and improved construction and operates efficiently, and in which provision is made for readily removing or replacing the parts thereof.

Other objects of the invention and the various advantages and characteristics of the present mixer construction, will be apparent from a consideration of the following detailed description.

The invention consists in the several novel features hereinafter set forth and more particularly defined by the claims at the conclusion hereof.

In the drawings which accompanies and forms a part of this description or specification and in which like numerals of reference denote corresponding or like parts:

Fig. 1 is a vertical longitudinal sectional view of a mixing device embodying the invention;

Fig. 2 is a horizontal transverse sectional view taken on the line 2—2 of Figure 1;

Fig. 3 is a sectional view taken on the line 3—3 of Fig. 1 and

Fig. 4 is a perspective of the ozone pipe and the upper part of the spreader.

The invention is exemplified in a device for mixing gas and liquid, such as ozone and water, and comprises a T-fitting 5 which is preferably arranged in a vertical position. The transverse branch 6 of this fitting extends horizontally and is connected to receive under pressure from any suitable source the water which is to be mixed with the ozone or ozonous air. The longitudinal and vertical branch 7 of the fitting is provided with flanges 8 and 9 and the upper end thereof is closed by a plate 10, which is clamped to the flange 8 by bolts 11. A washer 12 of rubber or any other suitable material is interposed between the plate 10 and the flange 8 to seal the joint. A ring 13 which is provided with end flanges 14 and 15 and tapers downwardly is secured to the lower end of the longitudinal branch 7 by bolts 16 which are carried by the flange 9 and extend through the flange 14. A washer 17 is interposed between the flanges 9 and 14 for sealing purposes. The lower end of the ring 13 communicates with a tubular element or casing 18, the upper end 19 of which tapers inwardly and forms with said ring a chamber 20 which corresponds in shape to an inverted cone. The lower end 21 of the casing 18 is flared outwardly to form a conoidal chamber 22 which communicates with the chamber 20 and is adapted to discharge or exhaust into a pipe connection 23 which is provided at its upper end with a flange 24. The upper and lower ends of the casing member 18 are provided with outwardly extending flanges 25 and 26. The contiguous faces of the flanges 15 and 25 and the flanges 24 and 26 are provided with circular grooves 27 in each pair of which is disposed a packing ring 28 which is preferably formed of oiled leather and operates to seal effectively the joints.

The ozone is delivered to the casing through a pipe 29 which extends through a circular hole 30 in the central portion of the plate 10. To prevent leakage of water around the pipe 29, a packing gland is provided. This gland comprises a bolt operated follower 31 and a packing receiver 32 which is formed integrally with the plate 10. The pipe 29 extends through the longitudinal branch 7 of the T-fitting and the ring 13 and its lower end projects into the chamber 20 and terminates adjacent the portion of the tubular member which is of the smallest diameter. The lower end of the pipe is flared outwardly as at 33, so as to form with the upper end 19 of the member 18 a comparatively wide tubular water conduit the sides of which converge downwardly or toward the lower end of the pipe 29. By constructing the water passage and constricting its discharge end as set forth, the water is spread out over a comparatively large area, i. e. it is formed from a comparatively thick stream into a relatively thin one. Furthermore the velocity of the water is increased while its direction remains unchanged.

The lower edge of the pipe 29 tapers inwardly to form a conoidal surface 34. Adjacent this surface and coaxial with the pipe is a spreader 35 the upper end 36 of which conforms in shape to said surface and forms therewith a circular passageway 37 which directs the ozone from the pipe 29 downwardly and outwardly. As the tubular stream of water passes by this passageway it exhausts the ozone from the pipe 29 and brings it into contact and affiliation therewith by aspiration. A characteristic and a result of utilizing a circular substantially unobstructed passageway for the ozone or gas and a comparatively wide tubular column of water or liquid which is forced in a thin stream past the passageway is that the aspiration effect is a maximum and the gas is thoroughly and uniformly commingled with the water.

The spreader is disposed in the chamber 22 and its side walls 38 are round and taper downwardly so as to form with the lower end 21 of the casing member a tubular water conduit into which the commingled water and ozone discharges. The sides of this conduit diverge downwardly and as a result the water spreads so that a thorough mixing of the water and ozone takes place. The diameter of the upper end of the spreader is slightly smaller than the diameter of the outer and lower edge of the pipe 29 so that the tubular stream of water will not splash into contact therewith. The upper end of the spreader is supported by a bolt 39. The lower end of this bolt is embedded in a socket 40 which is formed in the spreader and the upper end extends through a spider 41 which extends transversely across and is secured to pipe 29. A nut 42 is threaded to the extreme upper end of the bolt. By rotating this nut the spreader may be adjusted longitudinally into the desired position. The lower end of the spreader is provided with a concave socket 43 into which fits a correspondingly convex supporting element 44 which is provided with outwardly extending arms 45 which are formed integrally with the pipe connection 23. A bolt 46 is anchored to the lower end of the spreader 35 and extends longitudinally through the supporting element 44. The lower end of this bolt is provided with a nut 47 which when tightened operates to hold the spreader against lateral displacement. By having the contiguous faces of the supporting element and socket 43 convex and concave respectively, the spreader will automatically center itself when pulled downwardly by the nut 47.

The spider 41, bolts 39 and 46, and nuts 42 and 47 are preferably formed of nickel so that only a limited amount of oxidation will take place due to their contact with the ozone. The pipe 29, the spreader 35, the casing 18, and the pipe connection 23 and its supporting element 44 are all formed of glass, terra cotta or any other similar non-oxidizing material. The casing member 18 is clamped between the ring 13 and the pipe connection 23 by means of tie bolts 48 which extend through the flange 15 and a metallic collar 49. The latter extends around the pipe connection 23 and abuts against the flange 24. By tightening the nuts on the tie bolts the packing rings 28 may be compressed to form fluid-tight connections or joints.

To protect the glass or terra cotta pipe 29 against the impact and pressure of the lateral stream of water to which it is subjected, a pair of semi-cylindrical sections 50 are provided. These sections are preferably formed of galvanized sheet iron and extend around the pipe to form a cylindrical protecting shell which extends from the plate 10 to the base of the flared end of the ozone pipe. Spring steel rings 51 encircle the shell and press the sections 50 into abutting relation and contact with the pipe 29. A band 51 also encircles the sections and is suitably secured thereto against longitudinal movement. A plurality of braces 52, preferably four in number, extend between this band and the tapered wall of the ring 13. These braces extend upwardly and operate to support the pipe against the downward movement of the water column and so that the major part of the strain is not borne by the packing gland. Each brace comprises a pair of threaded members 53 which abut against the band and ring respectively and a sleeve 54 to which the members are threaded. The braces may be lengthened or shortened to center and position the pipe with respect to the casing 18 by rotating the sleeves 54. To prevent displacement of the braces the outer members 53 are provided at their outer ends with socket members 55 which fit into recesses in the wall of the ring.

A discharge pipe 56 is connected to the lower end of the pipe connection 23 by a sleeve 57 which is packed with cement.

The operation of the mixer will be as follows: Assuming that the pipe 29 is connected to receive ozone or ozonous air and that the branch 6 of the fitting is connected to receive water under pressure, the water will be forced into the longitudinal branch 7 and thence downwardly into the ring 13 where it will be confined and forced through the tubular and constricted conduit. The latter tends to increase the velocity of the water and to form it into a thin relatively wide annular stream which is projected past the circular ozone passageway 37 and there draws the ozone into contact with it by aspiration. From the passageway 37 the mixed water and ozone passes into the expanding conduit where it spreads and thoroughly commingles and mixes with the ozone. In assembling the mixer, the pipe 29 is centered with respect to the casing 18 by adjusting the braces 52. Thereafter the spreader is positioned to meet the desired requirements by adjusting the nut 42 and then tightening the nut 47 to jam the spreader into position. During this last mentioned operation the concave and convex surfaces automatically coact to center the spreader.

The invention exemplifies a device for mixing a gas and liquid by aspiration which is of new and improved construction and is especially designed and adapted for use in connection with water and ozone.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a mixer of the character described, the combination of a vertically extending annular casing member connected at the upper end thereof to receive liquid under pressure, said upper end of the member tapering downwardly to form a conoidal chamber, a vertical pipe connected to a supply of gas and having its lower end projecting into said chamber so as to terminate adjacent the narrowest part of the upper end of the member, said projecting end of the pipe flaring outwardly in a downward direction and forming with the upper end of the member a tubular or annular conduit, the sides of which converge toward their lower ends to form a constricted outlet for the liquid, and a spreader disposed beneath the said narrowest part of the upper end of the casing member and in the other end of said member and spaced from the lower end of the pipe to form a circular passageway adjacent the outlet and through which the gas will be drawn into contact with the tubular stream of liquid formed by said outlet.

2. In a mixer of the character described, the combination of a vertically extending annular casing member connected at the upper end thereof to receive liquid under pressure, said upper end of the member tapering downwardly to form a conoidal chamber, a vertical pipe connected to a supply of gas and having its lower end projecting into said chamber so as to terminate adjacent the narrowest part of the upper end of the member, said projecting end of the pipe flaring outwardly in a downward direction and forming with the upper end of the member a tubular or annular conduit, the sides of which converge toward their lower ends to form a constricted outlet for the liquid, and a spreader disposed beneath the said narrowest part of the upper end of the casing member and in the other end of said member and spaced from the lower end of the pipe to form a circular passageway adjacent the outlet and through which the gas will be drawn into contact with the tubular stream of liquid formed by said outlet, said spreader extending downwardly and forming with the said other end of the member a tubular exhaust conduit for the mixed gas and liquid.

3. In a mixer of the character described, the combination of a vertically extending annular casing member connected at the upper end thereof to receive liquid under pressure, a vertical pipe connected to a supply of gas and having its lower end extending into said one end of the member and forming therewith a comparatively thin tubular conduit for the liquid, and a spreader disposed in the lower end of the member and spaced from the lower end of the pipe to form therewith a circular passageway through which the gas will be drawn into contact with the liquid, said spreader projecting and tapering downwardly and forming with the said lower end of the member a tubular exhaust conduit, the sides of which diverge downwardly, so as to permit the liquid to spread laterally and to commingle with the gas after it has passed through the first mentioned conduit.

4. In a mixer of the character described, the combination of a vertically extending annular casing member connected at the upper end thereof to receive liquid under pressure, a vertical pipe connected to a supply of gas and having its lower end extending into said one end of the member and forming therewith a comparatively thin tubular conduit for the liquid, and a spreader disposed in the lower end of the member and spaced from the lower end of the pipe to form therewith a circular passageway through which the gas will be drawn into contact with the liquid, said lower end of the member flaring downwardly, said spreader projecting downwardly and forming with said other end of the member a tubular exhaust conduit the walls of which diverge downwardly, so as to permit the liquid to spread laterally and to commingle with the gas after it has passed through the first mentioned conduit.

5. In a mixer of the character described, the combination of a vertically extending annular casing member connected at the upper end thereof to receive liquid under pressure, said upper end of the member tapering inwardly to form a conoidal chamber, a vertical pipe connected to a supply of gas and having its lower end projecting into said chamber and forming with the upper end of the member a liquid conduit which is tubular and constricted at its bottom end, and a spreader disposed in the lower end of the member and spaced from the lower end of the pipe to form a circular passageway adjacent the constricted end of the conduit and through which the gas will be drawn into contact with the tubular stream of liquid, said lower end of the member flaring outwardly, said spreader projecting and tapering downwardly and forming with said lower end of the member a tubular exhaust conduit, the sides of which diverge downwardly, so as to permit the liquid to spread laterally and to commingle with the gas after it has passed through the first mentioned conduit.

6. In a mixer of the character described, the combination of means forming a vertically extending annular casing element, a fitting connected to the top of the element for delivering liquid under pressure thereto, a pipe connected at one end thereof to a source of gas and having its other end extending through the fitting and into the said one end of the element and forming therewith a comparatively thin tubular conduit for projecting the liquid in the form of an annular stream around the said other end of the pipe, and a sectional reinforcing shell mounted around the portion of the pipe which extends through the fitting.

7. In a mixer of the character described, the combination of means forming a vertically extending annular casing element, a fitting connected to the top of the element for delivering liquid under pressure thereto, a pipe connected at one end thereof to a source of gas and having its other end extending through the fitting and into the said one end of the element and forming therewith a comparatively thin tubular conduit for projecting the liquid in the form of an annular stream around the said other end of the pipe, a sectional reinforcing shell mounted around the portion of the pipe extending through the fitting, and spring rings for holding the sections in place.

8. In a mixer of the character described, the combination of an annular casing member connected at one end thereof to receive liquid under pressure, a pipe connected at one end to a supply of gas and having its other end extending into said one end of the member and forming therewith a tubular conduit for the liquid, a spreader disposed in the other end of the member and spaced from the said other end of the pipe to form therewith a substantially circular passageway through which the gas will be drawn into contact with the tubular stream of liquid formed by the conduit, a spider secured in said other end of the pipe, and bolt means carried by the spider for adjustably supporting the inner end of the spreader.

9. In a mixer of the character described, the combination of an annular casing member connected at one end thereof to receive liquid under pressure, a pipe connected at one end to a supply of gas and having its other end extending into said one end of the member and forming therewith a tubular conduit for the liquid, a spreader disposed in the other end of the member and spaced from the said other end of the pipe to form therewith a substantially circular passageway through which the gas will be drawn into contact with the tubular stream of liquid, means for supporting the inner end of the spreader, and self-centering means for supporting the outer end of said spreader.

10. In a mixer of the character described, the combination of a pair of casing members arranged one above the other, the upper casing member being connected to receive liquid under pressure and tapering downwardly to form a conoidal chamber, a vertical pipe connected to a supply of gas and having the lower end thereof projecting into the chamber and forming with said upper casing member a tubular liquid conduit which is constricted at its bottom end, the lower casing member flaring downwardly, and a spreader disposed in the lower casing member and spaced from the lower end of the pipe to form a circular passageway adjacent the constricted end of the conduit and through which the gas will be drawn into contact with the tubular stream of liquid, said spreader projecting and tapering downwardly and forming with said lower casing member a tubular exhaust conduit, the sides of which diverge downwardly.

11. In a mixer of the character described the combination of a vertically extending annular casing element, a fitting connected to the top of the element and adapted to deliver liquid under pressure thereto, said fitting having a horizontally extending liquid inlet and being provided with an apertured wall for closing its upper end, a vertical pipe adapted to receive gas at its upper end and extending through the aperture in the wall and projecting downwardly through the fitting and into the casing element, the lower end of the pipe forming with the contiguous portion of the casing element a comparatively thin tubular conduit for projecting the liquid downwardly in the form of an annular stream into which the gas is drawn, a packing gland between the pipe and the apertured portion of the wall for preventing leakage of liquid through the aperture, and adjustable braces between the pipe and casing element for centering the lower end of the pipe relatively to said element.

12. In a mixer of the character described, the combination of a vertically extending casing member connected at the upper end thereof to receive liquid under pressure and tapering downwardly to form a conoidal chamber, a vertical pipe connected at the upper end thereof to a supply of gas and having its lower end projecting into the chamber and forming with the casing member a tubular liquid conduit which is constricted at its bottom end, and adjustable braces abutting against the downwardly tapered portion of the casing member and extending upwardly to support and center the lower end of the pipe relatively to the casing member.

Signed at Chicago, Illinois, this 9th day of December, 1927.

JAMES MARLOWE DAILY.